UNITED STATES PATENT OFFICE.

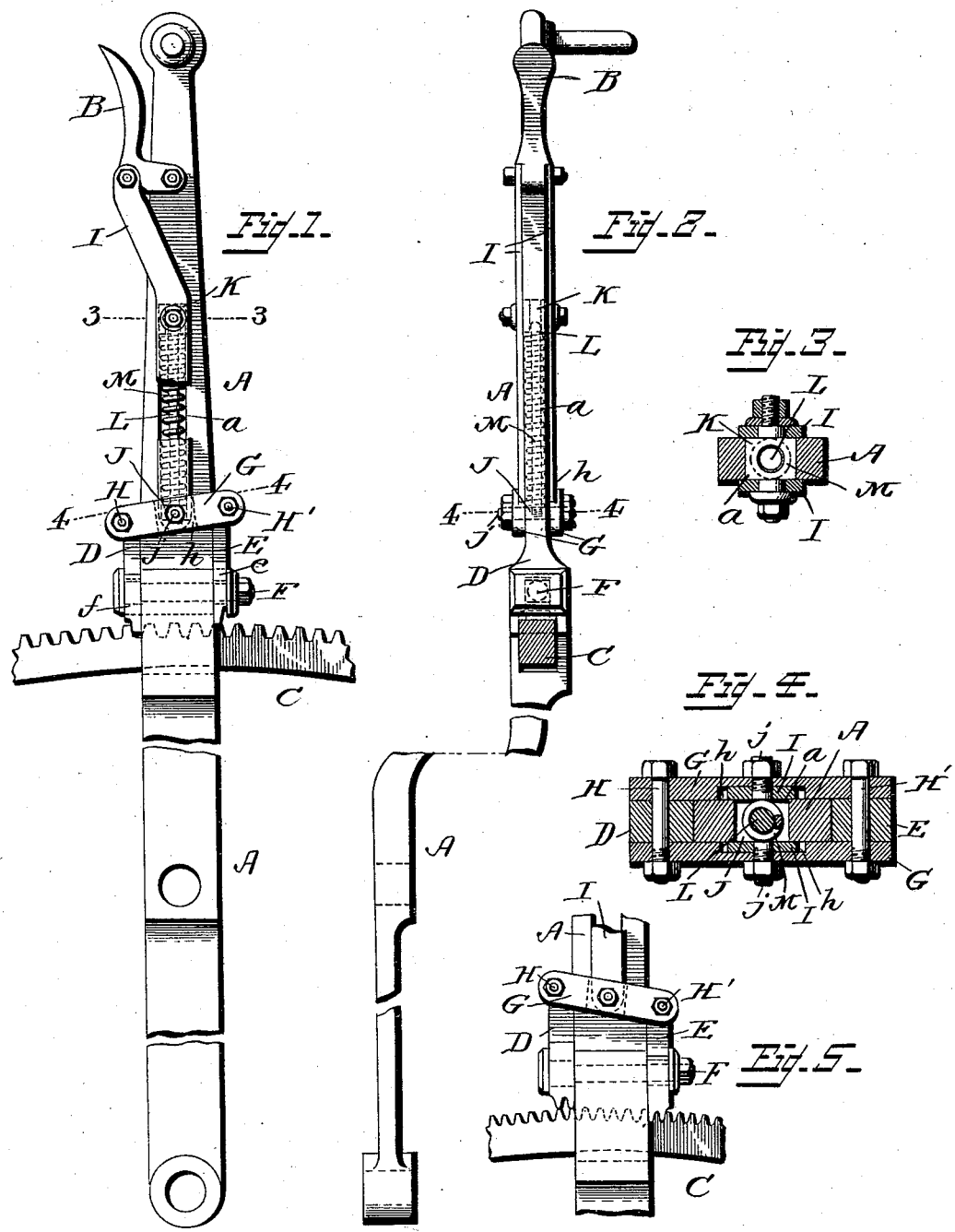

WILLIAM BAIRD NORRIS, OF BLAIRSVILLE, PENNSYLVANIA.

LEVER-LOCK MECHANISM.

SPECIFICATION forming part of Letters Patent No. 466,254, dated December 29, 1891.

Application filed September 23, 1891. Serial No. 406,586. (No model.)

*To all whom it may concern:*

Be it known that I, WILLIAM BAIRD NORRIS, a citizen of the United States, residing at Blairsville, in the county of Indiana and State of Pennsylvania, have invented certain new and useful Improvements in Lever-Lock Mechanism; and I do hereby declare the following to be a full, clear, and exact description of the invention, such as will enable others skilled in the art to which it appertains to make and use the same.

This invention relates to means for locking a lever to its quadrant. The object of the invention is to obtain a nice adjustment of the lever and prevent undue wear of the notches in the quadrant and obviate looseness or rattling of the said lever.

The improvement consists of two latches, one located in front of and the other in the rear of the lever, a cross-head having the said latches respectively at its opposite ends, and a latch-handle connected with the said cross-head and adapted to operate the said latches.

A further object of the invention is to locate the spring which holds the latches in efficient service within the lever and conceal them from view by means of the links which connect the latch-handle with the cross-head.

The improvement further consists of the novel features and the peculiar construction and combination of the parts, which will be hereinafter more fully described and claimed, and which are shown in the annexed drawings, in which—

Figure 1 is a side view of a lever and locking mechanism embodying my invention, parts being broken away. Fig. 2 is a front view of the mechanism shown in Fig. 1. Fig. 3 is a horizontal section on the line 3 3 of Fig. 1. Fig. 4 is a horizontal section on the line 4 4 of Figs. 1 and 2. Fig. 5 is a modification.

The lever A, quadrant C, and latch-handle B are of well-known construction and arrangement. The latches D and E (two being provided) are located, respectively, in the front and the rear of the lever A, being held thereto by bolt F, which passes through the said lever A and through slots $e$ and $f$, formed, respectively, in the said latches E and F. The cross-head G, which connects the two latches D and E, is composed of two bars, which are located on the opposite sides of the said lever A, being connected with the said latches D and E by bolts H and H', respectively. The link I, which connects the cross-head G midway of its ends with the latch-handle B, is composed of two bars, which are located on opposite sides of the said lever A and have their lower ends inserted in notches or recesses $h$, formed in the inner sides of the bars composing the cross-heads G. The nut J, having the laterally-threaded arms $j$, connects the bars of the link I with the bars of the cross-head G and is located at the lower end of the slot $a$ in the lever A. The corresponding nut or guide K is located at the upper end of the said slot $a$, and its threaded arms extend through the bars comprising the link I and connect them together at the point of deflection of the said link. The rod L, located in the slot $a$, has its lower end screwed into the nut J and its upper end inserted and adapted to work in the nut K. The spiral spring M, interposed between the nuts J and K and mounted on the rod L, is located in the slot $a$ and serves to hold the latches D and E in position for efficient service.

It will be observed that the links, or rather the bars comprising the link I, close in the sides of the slot $a$ and conceal the spring M and the rod L from view, and also exclude dust and dirt.

In Fig. 1 each of the latches is shown as constructed to engage with a single notch in the quadrant C, which will answer for general application; but better results are obtained when the said latches are provided with a series of teeth to engage with two or more notches in the said quadrant, as shown in Fig. 5. By this construction a neater adjustment of the lever A can be effected, as the spaces and numbers of notches in the quadrant can be increased.

It will be observed that the cross-head is adapted to have a vertical movement with the link I and a tilting motion on its pivotal connection with the said link I, thereby permitting the disengagement of the two latches from the quadrant when it is desired to shift the lever A. In Fig. 1 the latch E is resting on a tooth of the quadrant and the latch D is in engagement with a notch of the said quadrant. To disengage the latches from the quadrant, the latch-handle B is operated in the ordinary manner. When actuating the handle B, the latch D is first withdrawn from the notch in the quadrant until the lower closed end of the slot $f$ engages with the bolt F. A continued pressure on the handle B lifts the latch E from engagement with the quadrant. Both latches being free, the lever can be moved on the quadrant to the desired position, and on releasing handle B one or the other of the latches will engage with a notch on the quadrant and lock the said lever in a desired position. By locating the latches as hereinbefore specified one latch will not enter the same notch from which the other latch is withdrawn on a slight adjustment of the lever, thereby preventing a too great wear of the said quadrant.

Having thus described my invention, what I claim, and desire to secure by Letters Patent, is—

1. The combination, with a lever and a quadrant, of two latches located upon opposite sides of the said lever, a cross-head connecting the two latches, and a handle connected with the said cross-head and adapted to actuate both of the said latches, substantially as and for the purpose set forth.

2. The combination, with a lever and a quadrant, of two latches located upon diametrically-opposite sides of the said lever, a cross-head connecting the two latches, a latch-handle having connection with the cross-heads at a point midway of the ends of the latter, and a single spring located in a slot in the said lever and adapted to hold the said latches in efficient service, substantially as specified.

3. The combination, with a lever and a quadrant, of two latches located on diametrically-opposite sides of the said lever and having a series of teeth which are constructed to engage with two or more notches of the said quadrant, and a single latch-handle constructed to actuate both of the said latches, substantially as and for the purpose set forth.

4. The combination, with a lever having a slot, as $a$, two latches located on diametrically-opposite sides of the said lever, and a cross-head connecting the two latches; of a spring located in the slot $a$ and adapted to exert a downward pressure on the said cross-head, a single latch-handle, and a link composed of two bars, which close the sides of the said slot $a$ and connect the latch-handle with the cross-head, substantially as described, for the purpose specified.

5. The combination of a lever having slot $a$, the slotted latches D and E, located on opposite sides of the said lever, a bolt extending through the lever and the slot in the said latches, a cross-head composed of two bars, which embrace the sides of the lever and have pivotal connection at their ends with the said latches and which bars have recesses in their opposing sides, the latch-handle B, a link composed of two bars, which extend on opposite sides of the lever and conceal the slot $a$, the nut J, having threaded arms, which connect the lower end of the link I with the cross-head G, the guide-nut K, having threaded arms, which connect the bars comprising the link I at a point about opposite the top end of the slot $a$, the rod L, and the spring M, located in the said slot $a$ and concealed from view by the said bars, substantially as set forth.

In testimony whereof I affix my signature in presence of two witnesses.

WILLIAM BAIRD NORRIS.

Witnesses:
W. R. BOYER,
C. B. RHOADS.